United States Patent [19]

Rowan

[11] 4,050,521
[45] Sept. 27, 1977

[54] COMBINED TURNPLOW AND SUBSOILER

[76] Inventor: Robert A. Rowan, P.O. Box 68, Enigma, Ga. 31749

[21] Appl. No.: 704,302

[22] Filed: July 12, 1976

[51] Int. Cl.² ............... A01B 11/00; A01B 13/14
[52] U.S. Cl. ............................ 172/196; 172/611; 172/662
[58] Field of Search ............ 172/700, 699, 196, 190, 172/611, 683, 661, 662, 195

[56] References Cited

U.S. PATENT DOCUMENTS

| 996,718 | 7/1911 | James | 172/700 |
|---|---|---|---|
| 2,187,262 | 1/1940 | Brown | 172/611 |
| 3,467,199 | 9/1969 | Lowery | 172/611 X |

FOREIGN PATENT DOCUMENTS

| 291,100 | 12/1931 | Italy | 172/196 |
|---|---|---|---|
| 660,858 | 11/1951 | United Kingdom | 172/196 |
| 1,456 of | 1871 | United Kingdom | 172/196 |

*Primary Examiner*—Richard J. Johnson
*Attorney, Agent, or Firm*—Newton, Hopkins & Ormsby

[57] ABSTRACT

A turnplow and a subsoiler are attached to a common draft beam with the subsoiler pivotally mounted and counter-weighted so that lifting of the implement will cause automatic retraction of the subsoiler relative to the turnplow. A drag point on the subsoiler engages the ground when the implement is lowered and thereby moves the subsoiler to an active position below the turnplow. Simplicity of construction is featured.

6 Claims, 3 Drawing Figures

COMBINED TURNPLOW AND SUBSOILER

BACKGROUND OF THE INVENTION

The use of a subsoiler in combination with a main plow or turnplow is broadly known and examples of the patented prior art are contained in U.S. Pat. Nos. 1,403,618, Normandin, and 2,713,299, Shager et al. In the prior art, the constructions of the combined turnplows and subsoilders are relatively complex and costly and operating linkages are provided on the implements to move the subsoiler and/or turnplow relatively from the tractor seat or at the plow beam on which the implements are mounted.

The objective of the present invention is to simplify the construction of a combined turnplow and subsoiler and to render the movement of the subsoiler to and from active and inactive positions relative to the turnplow automatic as the combined instrument is lowered and raised as by the standard lift means of a farm tractor. In the present invention, the manual adjustment linkages of the prior art are entirely dispensed with, with the result that the implement is considerably more simplified and compact and consequently less expensive to manufacture. In the invention, when the combined implement is elevated from the ground, a counterweighted pivoted subsoiler swings automatically to an inactive retracted position with only a small drag point projecting below the bottom of the turnplow. Consequently, the complete implement may rest on the ground in a stable manner and the elevated implement will have good ground clearance during roadway transport. When the combined implement is lowered toward the ground, the drag point on the subsoiler will first penetrate the soil, and as a result of this, the pivoted subsoiler will be shifted to the active extended position relative to the turnplow automatically and without the necessity for an associated mechanical operating linkage. Retraction of the subsoiler, when the implement is elevated, is caused by gravity. The construction of the implement is extremely simple and its mode of operation is unique and efficient.

Other features and advantages of the invention will become apparent during the course of the following description.

DETAILED DESCRIPTION

Figure 1:
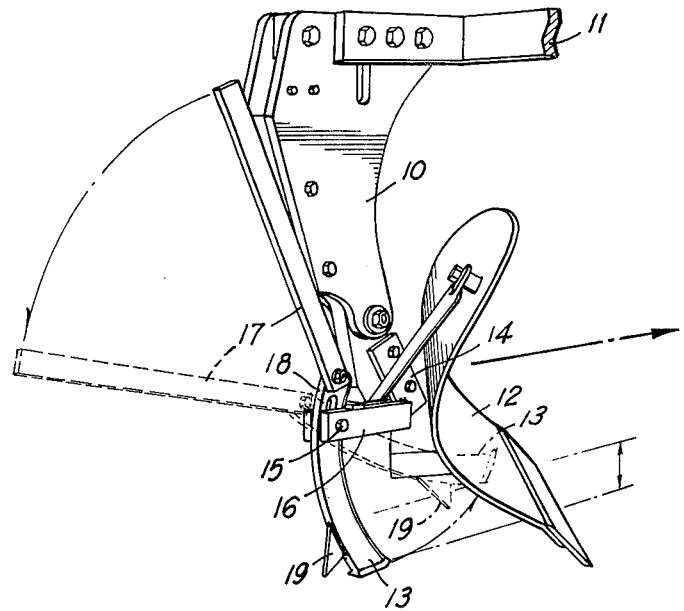
FIG. 1 is a perspective view of the invention showing the subsoiler extended in full lines and retracted or inactive in broken lines.

Referring to the drawings in detail, wherein like numerals designate like parts, the numeral 10 designates a draft or plow beam whose upper end is suitably secured to a conventional tractor like 11, or in some cases may be secured to an elevatable tool bar capable of supporting a gang of implements. The beam 10 forms a common support for a substantially conventional turnplow 12 and an associated subsoiler 13 which may be employed in conjunction with the turnplow for reasons well known in the art. The turnplow 12 is rigidly secured to the beam 10 through bracket means 14. The subsoiler 13 is pivotally mounted on the beam by a transverse axis pivot pin 15, carried by a fixed support bracket 16 on the beam structure. Above the pivot pin 15, a counterweight bar 17 is fixedly secured to the upper end of subsoiler arm 18. The geometry is such that when the combined implement is elevated from the ground by the tractor lift, the subsoiler 13 swings by gravity to the retracted position shown in FIG. 3 and also shown in broken lines in FIG. 1. In this position, the bottom of the subsoiler is substantially flush with the bottom of the turnplow 12 and within the confines of the turnplow, as shown in FIGS. 1 and 3.

A drag point 19 on the rear side of the subsoiler 13 near its lower end projects slightly below the turnplow 12 when the subsoiler is in the retracted position, FIG. 3, the projection distance of the drag point below the turnplow being indicated by the arrows in that figure. Consequently, when the combined implement is lowered to the earthworking position, FIG. 2, the drag point 19 first penetrates the soil and the resulting drag action shifts the subsoiler 13 to the active extended position well below the turnplow 12 designated by the arrows in FIG. 2. As long as the combined implement is in the earthworking position, the subsoiler will automatically maintain its extended position due to the pressure of the soil on it as the implement advances. When the combined implement is again elevated, the subsoiler will return automatically by gravity to the retracted position with only the tip of the drag point 19 projecting below the turnplow.

The mode of operation is positive and automatic and no complex operating linkages, either manual or powered, are required. The construction is simple and compact as well as sturdy and durable and the manufacturing cost of the invention is comparatively little.

Figure 2:
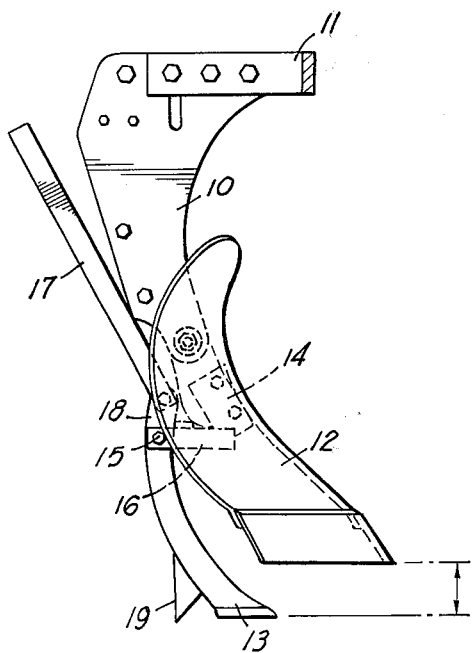
FIG. 2 is a side elevation of the invention showing the subsoiler extended.
Figure 3:
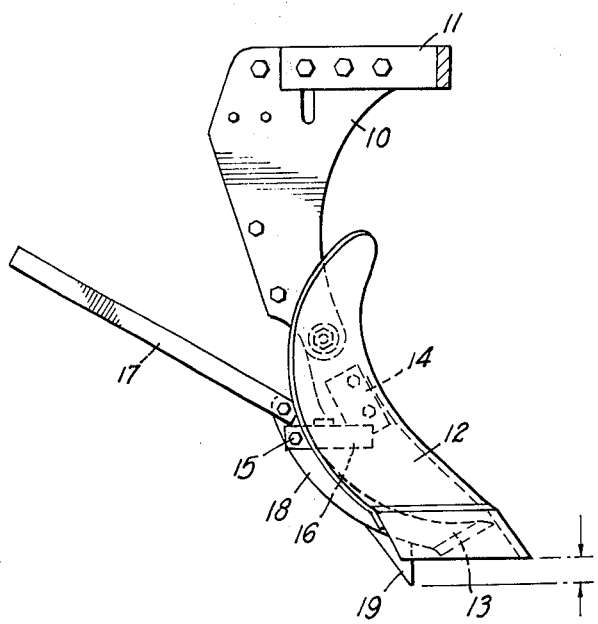
FIG. 3 is a similar side elevation showing the subsoiler retracted by gravity when the combined implement is elevated.

The pivoted subsoiler 13 is self-limiting in both directions of its movement by positive contact with the beam 10, FIG. 2, and the turnplow 12, FIG. 3, and therefore no controls on the movement of the subsoiler are necessary. The advantages of the invention over the prior art should now be apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A plow device comprising a support means adapted to be raised and lowered, a main plow element attached to the support means, and a secondary counterweighted plow element movably connected with the support means and being shiftable relative to the main plow element to and from retracted and extended positions, raising of the plow device causing the secondary plow element to move by gravity to said retracted position, the secondary plow element having a part which contacts the soil when the plow device is lowered thereby moving the secondary plow element to said extended position, and wherein said secondary counterweighted plow element is pivotally mounted on the support means and swingable on its pivot axis automatically to said retracted position when the plow device is elevated.

2. A plow device as defined in claim 1, and said main plow element comprising a turnplow and said pivotally mounted secondary counterweighted plow element comprising a subsoiler.

3. A plow device as defined in claim 1, and a drag point on the secondary counterweighted plow element adapted to project below the bottom of the main plow element when the secondary counterweighted plow element is in the retracted position.

4. A plow device as defined in claim 1, and said pivoted secondary counterweighted plow element comprising a subsoiler including a ground-engaging element constructed and arranged to project below the main plow element and subsoiler when the subsoiler is in the retracted position, a pivotal support means for said subsoiler on said support means, and a counterweight bar secured to the subsoiler and extending on one side of the pivotal support means, whereby the counterweight bar is influenced by gravity to move the subsoiler on said pivotal support means to said retracted position when the plow device is elevated.

5. A plow device comprising a support means adapted to be raised and lowered, a main plow element attached to the support means, and a secondary counterweighted plow element movably connected with the support means and being shiftable relative to the main plow element to and from retracted and extended positions, raising of the plow device causing the secondary plow element to move by gravity to said retracted position, the secondary plow element having a part which contacts the soil when the plow device is lowered thereby moving the secondary plow element to said extended position, and said part on the secondary plow element comprising a drag point which projects somewhat below the main plow element when the plow device is raised and said secondary plow element is in the retracted position.

6. A plow device comprising a support means adapted to be raised and lowered, a main plow element attached to the support means, and a secondary counterweighted plow element movably connected with the support means and being shiftable relative to the main plow element to and from retracted and extended positions, raising of the plow device causing the secondary plow element to move by gravity to said retracted position, the secondary plow element having a part which contacts the soil when the plow device is lowered thereby moving the secondary plow element to said extended position, and wherein said support means comprises a plow beam common to the main plow element and secondary counterweighted plow element and supporting both and adapted for attachment to an implement lift, and wherein parts of said plow beam and main plow element are in the path of movement of the secondary counterweighted plow element to positively limit movement of the secondary counterweighted plow element in opposite directions.

* * * * *